April 10, 1945.   H. L. YOUNG   2,373,215
METHOD AND APPARATUS FOR TREATING PLASTIC FILM
Filed March 3, 1943
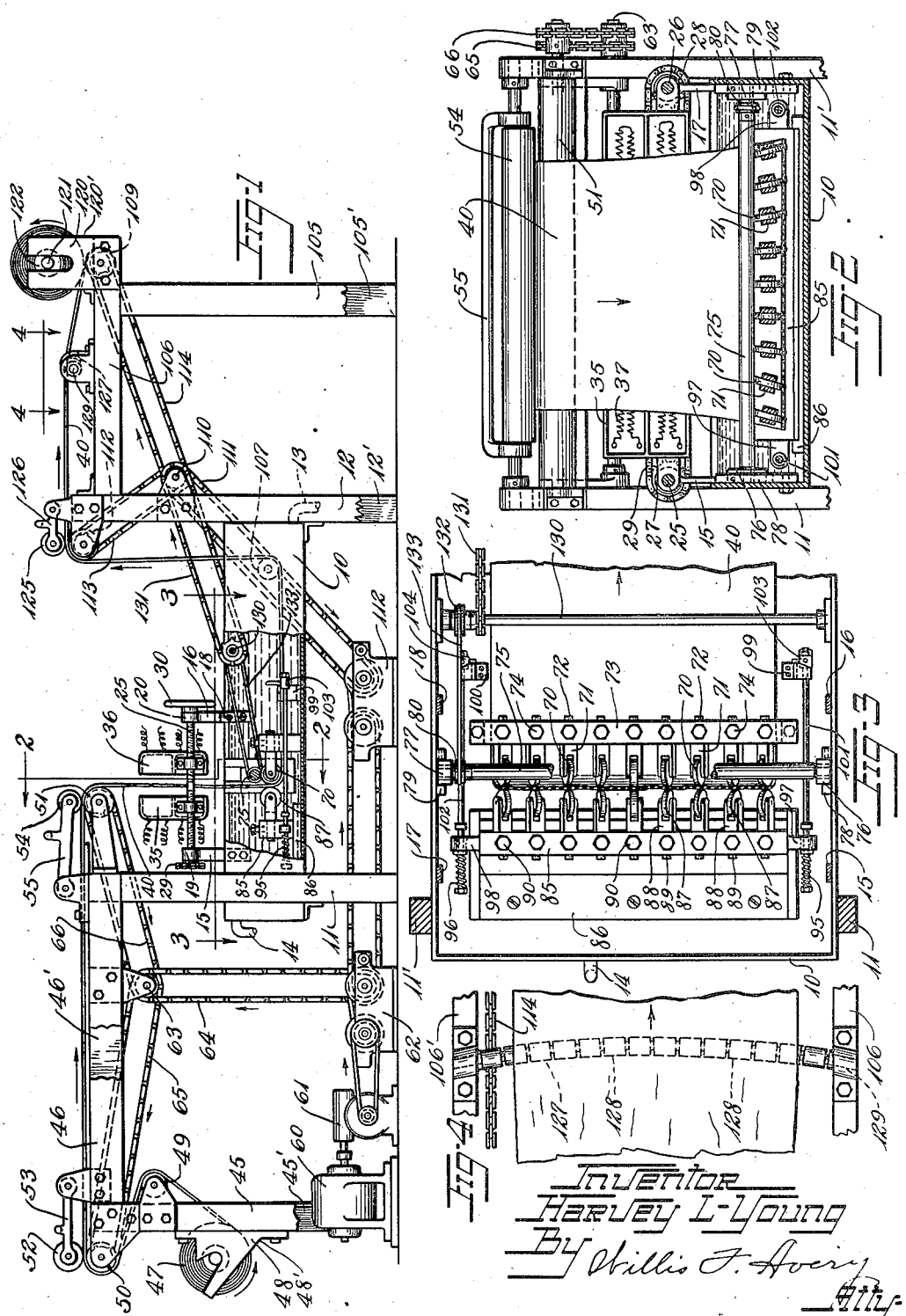

Patented Apr. 10, 1945

2,373,215

UNITED STATES PATENT OFFICE 2,373,215

METHOD AND APPARATUS FOR TREATING PLASTIC FILM

Harvey L. Young, Akron, Ohio, assignor to The B. F. Goodrich Company, New York, N. Y., a corporation of New York Application March 3, 1943, Serial No. 477,847

16 Claims. (Cl. 18—1)

This invention relates to the treatment of films of heat plastic material and is especially useful in shrinking of calendered films of plastic material.

In the manufacture of films of thermoplastic material such as plasticized polymerized vinyl chloride by calendering the film from a batch of the material it has been found that a molecular stretching apparently takes place so that the material after calendering is under longitudinal stress and shrinks lengthwise with a corresponding widening of the film under heat treatment. It has also been found that when it is attempted to remove the stress by heat applied thereto the material becomes so adhesive as to prohibit the use of heat conducting means applied directly to its surface while heat applied by radiation first causes the film to buckle or wrinkle so as to defeat uniform heating thereafter and the sticky nature of the heated material makes tentering of the material when heated difficult.

The principal objects of the present invention are to provide for heating and flattening a film to remove stress while avoiding undesirable buckling of the film, to provide for simultaneous cooling and flattening of the film, and to provide effective control of the heating and cooling.

These and other objects will appear from the following description and the accompanying drawing.

Of the drawing,

Fig. 1 is a side elevation of apparatus constructed in accordance with and embodying the invention, parts being broken away to show the mechanism.

Fig. 2 is a vertical sectional view taken on line 2—2 of Fig. 1, parts being broken away.

Fig. 3 is a sectional plan view taken on line 3—3 of Fig. 1, parts being broken away.

Fig. 4 is a detail sectional plan view taken on line 4—4 of Fig. 1.

In the illustrated embodiment of the invention a film of calendered plastic is fed downwardly between adjustable heat-radiating means into a tank of cooling liquid and between spreading means designed to flatten the film. The film travels from a vertical to a horizontal position about a set of spreading rollers constructed and arranged so that the film is positively driven thereby and is further cooled by passing horizontally to a submerged roller about which it turns to emerge from the tank.

Referring to the drawing, a cooling tank 10, open at its top, is supported by columns 11, 11', 12, 12' and is provided with an inlet pipe 13 for supplying cooling water, and an outlet pipe 14. Fixed to the side walls of the tank and extending thereabove are brackets 15, 16, 17, 18. Brackets 15, 16 at one side of the tank have aligned bearings 19, 20 for rotatably supporting a shaft 25 and brackets 17, 18 are similarly formed with aligned bearings for a similar shaft 26 parallel thereto. These shafts have sprockets 27, 28 fixed thereto respectively and a chain 29 extends about these sprockets to move them in unison. A handwheel 30 is fixed to shaft 25 to turn the shafts. A carriage 35 has threaded engagement with right-hand threads of shafts 25, 26 and a similar carriage 36 has threaded engagement with left-hand threads of the same shafts. These carriages are in the form of reflectors facing each other and supporting heating elements 37 preferably adapted to be heated by electricity. The arrangement is such that a film 40 may be passed vertically into the tank between the heating elements which may be adjusted toward and away from the film.

For feeding the film to the tank, columns 45, 45' are provided and spaced from frame members 11, 11' by frame members 46, 46'. A roll 47 of the film 40 is supported for rotation in chocks 48, 48', supported by columns 45, 45' and is led about an idler roll 49 and then about driven rolls 50, 51 rotatably journaled on the frame members. A weighted idler roll 52 is journaled in a swing frame 53 hinged to the frame members so as to rest on the film over roll 50 to increase the frictional driving thereof. A similar idler roll 54 is journaled in a swing frame 55.

An electric motor 60 drives a speed reducer 61 which in turn drives a variable speed drive 62 of the Reeves type, which in turn drives a counter-shaft 63 rotatably journaled in the frame members 46, 46' through a chain 64 and sprockets fixed to the driving shaft of the speed reducer and the counter-shaft respectively. Counter-shaft 63 in turn drives rolls 50, 51 through chains 65, 66 and sprockets fixed to the shafts. Rolls 50 and 51 are driven at the same speed. The arrangement is such that the delivery speed of roll 51 may be adjusted to regulate the speed of the film passing between the heating elements.

As the film is heated it softens and tends to buckle due to shrinkage so as to drape in folds. The folds, if allowed to develop freely, would shield some portions from the heat and disturb the uniformity of distance between the heating elements and the film, causing uneven heating. To prevent undesirable buckling and draping, a set of discs 70 are mounted submerged in the cooling liquid for rotation about axes in the same vertical plane with their axes inclined progressively to the horizontal from the center line of the film outwardly toward its margins and with the tops of the rollers tangent to the same horizontal plane. The discs are individually mounted in forks 71 having cylindrical shanks 72 clamped in horizontal apertures of a bar 73 fixed to the tank, and are adjusted so as to rotate in diverging directions in respect to the direction of the film. The forks are clamped in place by set screws 74. Each disc has a rubber-faced periphery to provide better traction.

For driving the discs, a roller 75 is rotatably mounted in bearings 76, 77 secured to the tank with its axis in the same vertical plane as the discs and its periphery tangent to the discs. The roll 75 has its surface friction increased as by a covering of friction tape to increase traction. Bearings 76, 77 are adjustable vertically in guideways 78, 79 and are locked in place by set screws. A pulley 80 is fixed to roller 75 for driving it.

For pressing the film against discs 70, a carriage 85 is slidably mounted in a horizontal guideway of a plate 86 fixed to the tank bottom. A second set of discs 87 are individually mounted for rotation in forks 88 having cylindrical shanks 89 rotatably mounted in horizontal apertures in carriage 85 and clamped in place by set screws 90. Each disc 87 is opposite a disc 70 and is adjusted to rotate in the same plane as its mate. Pressure between the pairs of discs is applied by springs 95, 96 which urge the carriage 85 toward the bar 73.

For releasing the spring pressure on the discs for threading the machine, carriage 85 has ears 97, 98 on its ends. Ears 99, 100 are fixed to the tank in line therewith, and rods 101, 102 are passed through the ears. The springs 95, 96 are mounted about the rods between ears 97, 98 respectively and stop collars on the ends of rods 101, 102 respectively. The rods have collars 103, 104 fixed to their opposite ends. These collars have inclined cam faces which engage cam faces on ears 99, 100. The arrangement is such that by rotating the rods 101, 102 in one direction the springs 95, 96 are placed under compression, and by rotating them in the opposite direction the spring pressure is released.

For withdrawing the film from the tank, columns 105, 105' are spaced from columns 12, 12' by frame members 106, 106'. A guide roller 107 is rotatably mounted on the tank 10 submerged in the liquid. A driven roller 108, thereabove, is rotatably mounted on columns 12, 12'. A similar rubber covered driven roller 109 is rotatably mounted on frame members 106, 106'. A countershaft 110 is rotatably mounted on columns 12, 12' and is driven by a chain 111 and suitable sprockets from a variable speed drive 112 which in turn is driven by variable speed drive 62. Chain drives 113, 114, drive rolls 108, 109 respectively from countershaft 110. A set of chocks 120, 120' are fixed to frame members 106, 106' and have vertical slots for retaining a shaft 121 about which a stock shell 122 is rotatably carried. Stock shell 122 receives the film 40 which is rewound thereon by contact with driven roll 109 and is rewound at the surface speed of roll 109. A weighted roll 125 is rotatably mounted in a swing frame 126 hinged to columns 12, 12' and rests on the film over roll 108 to increase traction. A spreading roll 127 (shown in Fig. 4) is mounted on frame members 106, 106' between rolls 108 and 109. It comprises a series of short rollers 128 mounted for free rotation about a bar 129 which is bowed convexly toward roll 109. Its rolls rotate by contact with the film and in divergent directions to spread or tenter the film contacting therewith.

For driving roll 75, a countershaft 130 is rotatably mounted on the tank 10 and is driven from countershaft 110 by a chain 131 and suitable sprockets. Shaft 130 has a pulley 132 fixed thereto which drives roller 75 through a belt 133 engaging pulley 80.

In the operation of the apparatus a roll 47 of calendered film is placed in chocks 48, 48' and threaded about roll 49 between rolls 50 and 52, and between rolls 51 and 54, rolls 50 and 51 withdrawing the film from roll 47 at a uniform speed adjustable by virtue of the variable speed drive 62. The film is then passed downwardly into the tank 10 between submerged discs 70 and 87, the rods 101, 102 being rotated to open the space between the rolls for threading the machine. The leading end of the film is drawn under roll 107 and between rolls 108 and 125, over spreader roll 127 and over roll 109 where it is started about the windup shell. Rods 101, 102 are then rotated to cause the discs 70, 87 to press against the film, heat is applied to the film by energizing the heating elements 37 and the machine is ready for operation. The speed of the discs 70 and the winding speed of the film will vary with adjustment of the variable speed drive 62 but may be varied with respect to speed of delivery of the film by virtue of variable speed drive 112. Variable speed drive 112 is adjusted so that the withdrawal speed is less than the feed-in speed by the amount to accommodate shrinkage and the angular disposition of discs 70, 87 is adjusted to tenter the film by an amount corresponding to the widening of the film due to shrinkage.

As the discs 70, 87 are submerged in water or other cooling liquid which is not a solvent of the film, and the film is wet by the liquid before it contacts the discs, the film does not adhere to the discs although the discs are effective to remove buckles and wrinkles extending above the liquid where the film is extremely adhesive. The water or other liquid also cools and sets the plastic film.

The heating means are adjustable as to distance from the film, even though it may heat the film to as much as 300° F. so that the water in the tank is raised to boiling temperature at the position of immersion of the film, yet it is found that the apparatus effectively accomplishes the purposes hereinbefore stated. Water may be admitted and circulated to maintain the water in the tank at the desired temperatures.

Variations may be made without departing from the scope of the invention as it is defined by the following claims.

I claim:

1. Apparatus for treating a film of thermoplastic material, said apparatus comprising a bath of cooling liquid, means for conducting a heated film progressively into said bath, and spreading means submerged in the bath for exerting a spreading force on the film laterally away from an intermediate region of the film.

2. Apparatus for treating a film of material which tends to wrinkle when heated, said apparatus comprising a bath of cooling liquid, means for conducting a heated film progressively into said bath, and means for stretching the film laterally while drawing the film into said bath.

3. Apparatus for treating a film of thermoplastic material, said apparatus comprising a bath of cooling liquid, means for conducting a heated film progressively into said bath, means for withdrawing the film from the bath at a speed reduced to compensate for longitudinal shrinkage, and means submerged in the bath for stretching the film laterally.

4. Apparatus for treating a film of thermoplastic material, said apparatus comprising a bath of cooling liquid, means for conducting a film progressively into said bath, means for progressively heating the film as it approaches the bath, and means submerged in the bath for stretching the film laterally.

5. Apparatus for treating a film of material which tends to wrinkle when heated, said apparatus comprising a bath of cooling liquid, means for conducting a film progressively through a free reach thereof into said bath, means for progressively heating said reach, and means submerged in the bath for stretching the film laterally in said reach.

6. Apparatus for treating a film of thermoplastic material, said apparatus comprising a bath of cooling liquid, means for conducting a film progressively through a free reach thereof into said bath, means for progressively heating said film in said reach, and means submerged in the bath for stretching the film laterally above the bath in said reach.

7. Apparatus for treating a film of thermoplastic material, said apparatus comprising a bath of cooling liquid, means for conducting a free reach of the film into said bath, heat-radiating means at opposite sides of said reach for heating it as it passes to said bath, and means submerged in said bath for stretching the film laterally to prevent excessive buckling of the heated film above said bath.

8. Apparatus for treating a film of material which tends to wrinkle when heated, said apparatus comprising cooling means, means for conducting a heated film progressively to said means, cooperating pairs of rotatable discs for engaging the film at positions across its width for advancing the film through said cooling means, said discs being inclined progressively from the center to the edges of the film in diverging relation to the direction of travel of the film to spread the film laterally, and means for rotating at least some of the discs to advance the film.

9. Apparatus for treating a film of thermoplastic material, said apparatus comprising a bath of cooling liquid, means for conducting a free reach of heated film to said bath, cooperating pairs of rotatable discs submerged in said bath for engaging the film at positions across its width, said discs being inclined progressively from the center to the edges of the film in diverging relation to the direction of travel of the film to spread the film laterally, and means for rotating at least some of the discs to advance the film through said bath.

10. Apparatus for treating a film of thermoplastic material, said apparatus comprising delivery means for progressively advancing the film into a free reach thereof, radiating means for heating the film at the free reach thereof to shrink the film lengthwise, means engaging the film at a speed slower than that of the delivery means for withdrawing the film from the free reach thereof at a reduced speed to compensate for longitudinal shrinkage, and means for stretching the film in said reach to take up lateral expansion due to shrinking.

11. Apparatus for treating a film of thermoplastic material which tends to buckle when heated, said apparatus comprising a bath of cooling liquid, means for advancing the film progressively into a free reach thereof extending into said bath, radiating means for heating the film at the free reach thereof to shrink the film lengthwise, means for withdrawing the film through said bath from the free reach thereof at a reduced speed to compensate for longitudinal shrinkage, and means submerged in said bath for stretching the film to take up lateral expansion due to shrinkage, said last-named means being effective to prevent excessive buckling in said free reach above said bath.

12. Apparatus for treating a film of thermoplastic material, said apparatus comprising a bath of cooling liquid, means for advancing the film progressively into a free reach thereof extending into said bath, radiating means for heating the film at the free reach thereof to shrink the film lengthwise, means for withdrawing the film through said bath from the free reach thereof at a reduced speed to compensate for longitudinal shrinkage, and means submerged in said bath for spreading the film to take up lateral expansion due to shrinkage, said last-named means being effective to prevent excessive buckling in said free reach above said bath, said spreading means comprising pairs of rotatable discs for engaging the film at positions across the film, said discs being inclined progressively from the center of the film toward its edges in a direction diverging with respect to the direction of travel of the film.

13. The method of treating a film of material which tends to wrinkle when heated which comprises feeding the film progressively to a free reach thereof, advancing the film from the free reach through cooling means, and stretching the film laterally of its direction of travel in said reach as it approaches the cooling means.

14. The method of treating a film of thermoplastic material which tends to wrinkle when heated which comprises progressively heating the film, feeding the heated film downwardly into a bath of cooling liquid, and stretching the film above said bath to compensate for longitudinal shrinkage thereof.

15. The method of treating a film of thermoplastic material which tends to wrinkle when heated which comprises progressively feeding the film downwardly to a bath of cooling liquid in a free reach, heating the film at the free reach, and stretching the film above said bath and at a submerged position to compensate for longitudinal shrinkage while drawing the film through the bath at a reduced speed.

16. The method of treating a film of thermoplastic material which tends to wrinkle when heated which comprises progressively feeding the heated film downwardly through a free reach into a bath of cooling liquid, progressively heating the film in said reach, drawing the film through the bath at a reduced speed to compensate for longitudinal shrinkage, and stretching the film laterally above said bath and at a submerged position to remove excessive buckling in the said free reach and to compensate for lateral expansion due to longitudinal shrinkage.

HARVEY L. YOUNG.